(12) United States Patent
Kwok et al.

(10) Patent No.: US 7,879,436 B2
(45) Date of Patent: Feb. 1, 2011

(54) PACKAGING PRODUCT

(75) Inventors: John Kwok, Hawthorn East (AU); John Charles Punter, Dandenong (AU)

(73) Assignee: Cushionflute Pty. Ltd., Albert Park (AU)

( * ) Notice: Subject to any disclaimer, the term of this patent is extended or adjusted under 35 U.S.C. 154(b) by 794 days.

(21) Appl. No.: 11/682,760

(22) Filed: Mar. 6, 2007

(65) Prior Publication Data

US 2007/0207287 A1     Sep. 6, 2007

(51) Int. Cl.
*B32B 3/20*     (2006.01)
*B65D 25/00*     (2006.01)

(52) U.S. Cl. .......................... 428/188; 428/53; 428/54; 428/58; 229/103.2; 229/103.3; 220/62

(58) Field of Classification Search .................... 428/53, 428/54, 57, 58, 59, 121, 130, 178, 181, 182, 428/183, 184, 185, 186, 188; 224/906; 206/521, 206/522; 220/62, 62.1; 229/103.11, 103.2, 229/103.3; 383/2, 3, 4
See application file for complete search history.

(56) References Cited

U.S. PATENT DOCUMENTS 3,203,618 A * 8/1965 Andrews et al. ......... 229/103.2

FOREIGN PATENT DOCUMENTS

| CN | 1506281 | 6/2004 |
|---|---|---|
| DE | 10164057 | 10/2002 |
| EP | 1369353 | 12/2003 |

* cited by examiner

*Primary Examiner*—David R Sample
*Assistant Examiner*—Catherine Simone
(74) *Attorney, Agent, or Firm*—Chernoff, Vilhauer, McClung & Stenzel

(57) ABSTRACT

A synthetic board is made from a plastic film ply 4, 6 adhered or welded to a parallel array of thin-walled plastic tubes 2. In some versions, the tubes are spaced from each other. In others the tubes are contiguous. This allows the board to curl up more or less depending on the tube packing about the tubes axes but to resist bowing between the ends of the tubes. The board is useful for packaging, display, cladding and insulation. In some versions, a second parallel array 7 lies at 90° to the first and the board is free to fold about the boundary between the two arrays. In this way, runs of cruciform carton blanks can be manufactured. The tubes can contain particulate or gel filling.

16 Claims, 4 Drawing Sheets

PACKAGING PRODUCT

FIELD OF THE INVENTION

This invention concerns packaging and especially sheet packaging sheet material.

BACKGROUND OF THE INVENTION

The packaging industry makes extensive use of paperboard consisting of two plies of card connected by an intermediate corrugated paperboard layer. This structure relies upon adhesion of the glue between the paper surfaces and needs moisture resistant finishes if deterioration by moisture penetration is to be avoided. This disadvantage applies to all cellulose-based products.

Large volumes of goods are shipped in cartons made from erected rectangular paperboard blanks made from sheet material as described above. For many products such as furniture and white goods, some cushioning is very useful. The only common double skin plastic sheet is CORFLUTE™ board. This resists flexure In all directions but finds limited use in packaging, even though it is capable of taking print and its main use is signage.

DE 101 64057 describes a multi-layered packaging material, one form of which has a top and bottom polyethylene plies mutually connected by a core of side by side foam plastic pipes with inside diameters of 40-60 mm and wall thickness from 10-20 mm. The pipes are made from polyethylene or polystyrene. The pipes are welded to the plies. The material is intended to absorb shock loads.

EP 1369353 describes a laminated packaging material consisting of a top and bottom extruded plastic fluted plies with a core made of multiple superimposed corrugated plies made of fibreboard. Multiple ply products tend to produce extra rigidity, but this is not always an advantage in that cartons tend to be made from folded blanks and thick boards must be notched to allow mitred joints at the folds.

SUMMARY OF THE INVENTION

The apparatus aspect of this invention provides synthetic board comprising an array of side by side, thin-walled, longitudinal tubes and a face ply to which the tubes are fixed at a circumferential site whereby the board flexes somewhat about an axis parallel to the tube axis but resists flexing along an axis transverse to the tube's axes.

Another apparatus aspect provides synthetic board comprising a first array of side by side, thin walled tubes and a second array of side by side thin walled tubes in a common plane, the second array being adjacent the first array but disposed transversely to the first array and a flexible face ply to which the tubes are fixed at a circumferential site whereby the board flexes about the boundary between the first array and the second array.

Preferably the first and second arrays are substantially at 90°.

Accordingly the first array may be flanked by arrays on two opposite edges of the first array giving a generally cruciform shape, all the tubes being fixed to one or more rectangular face plies.

If the board is intended for carton construction, both the second arrays may constitute upstanding walls of the carton.

The first array of tubes may be composed of a group of tubes of equal length laid end to end with a second group of tubes of equal length, all being fixed to a common facing ply. The boundary between the groups provides a flexing axis. In this way a carton blank may be built where the groups of the first array forms the floor and ends of a carton while the second array at 90° forms the sides of the carton.

The tubes may be separated from each other. Alternatively the tubes may be mutually contiguous.

In a more usual form, the tubes are fixed to top and bottom-facing plies; the tubes being attached to the plies at diametrically opposed sites.

In a more substantial board, there may be a top ply and a bottom ply and an intermediate ply and two layers of tubes, the direction of the tube axes being either parallel or mutually at 90°.

When the tubes are at 90° in two superimposed layers, the board resembles plywood in that flexing in two directions at right angles is resisted "Flexing" in this specification means bending between the ends of the tube. The tubes also compress under load to assume an elliptical section but they rebound to a circular cross-section.

The resistance to flexing is controlled by the thickness of the facing ply or plies, the tightness of the tube packing or the spacing between adjacent tubes and the wall thickness of the tubes themselves. By selecting suitable values for these factors, a board with specific performance can be manufactured but all tend to when handled curl up around the tube axes more easily than they bow between the ends of the tubes.

The tubes may be made of an extrudable polymer, eg. polylkylene. The ply or plies may be of the same or different material depending on the purpose. Combinations of paper, plastic sheet, metal foil and wood veneer are useful. The use of multiple tubes in the product allows variation in design. The tubes may vary in wall thickness. A tube may be periodically substituted by a rod.

The tube diameter may be 3, 4, 5 mm or more in diameter. The plies may be 30-250 μ. The tube wall thickness may be 100-250 μ. The tubes may contain a particulate material, conveniently powders or crystals, for example drying agents. Alternatively the tubes may contain a liquid or gel, for example of fire retardant or cushioning gel. The board may be supplied to customers as a roll of a width to their order, but typically 1200 mm. The board may alternatively be supplied as sheets 2400×1200 and 1800×900 mm.

For some applications the board has tubes arranged in chequerboard fashion with successive squares having tubes mutually at 90°. Such tube arrays between twin face plies impose rigidity and are intended for non-flexing duty.

BRIEF DESCRIPTION OF THE DRAWINGS

Certain embodiments of the invention are now described by way of example with reference to drawings which are diagrammatic end views, and, FIG. 1 is a single ply version.

DETAILED DESCRIPTION WITH RESPECT TO THE DRAWINGS

Figure 1:
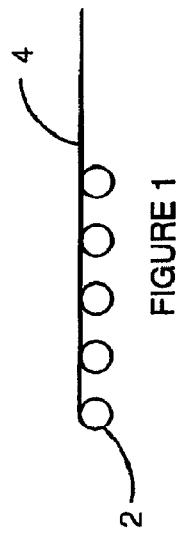

In FIG. 1 a series of extruded polypropylene tubes 2, 3 mm diameter are fused to a 50 μ sheet 4 of polypropylene by welding at the points of contact. The tubes are separated by an array of temporary spacers (not shown) during welding. This structure allows the flexing through 180° while resisting flexing out of the axes of the tubes.

Figure 2:
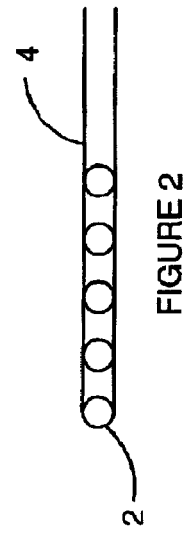
FIG. 2 is a double ply version.

In FIG. 2 a second sheet 6 is added to the structure and the welds hold at 0° and 180° around the tube, reducing the flexure about the axes of the tubes and increasing the resistance to flexure out of the plane of the structure at 90°. These effects are multiplied in the version shown in FIGS. 3 and 4. The result in FIG. 4 is a structure in which the tubes are able to roll against each other at 90° and 270° on their circumferences.

Figure 5A:
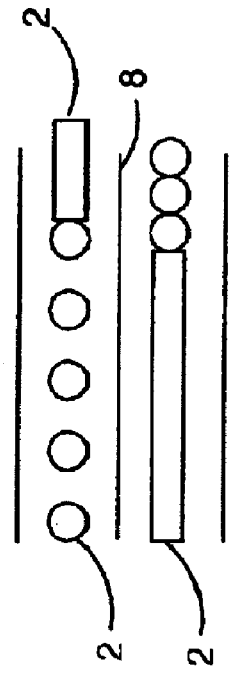
FIG. 5a is an exploded view of a triple ply version with 90° tubes affixed.
Figure 5:
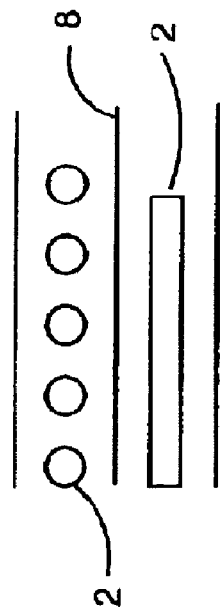
FIG. 5 is an exploded view of a triple ply version.

In FIG. 5 an intermediate ply 8 separates two layers of tube 90° to each other.

Figure 4A:
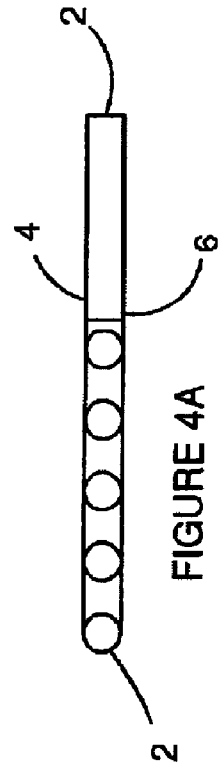
FIG. 4a is a further double ply version with 90° tubes affixed.
Figure 4:
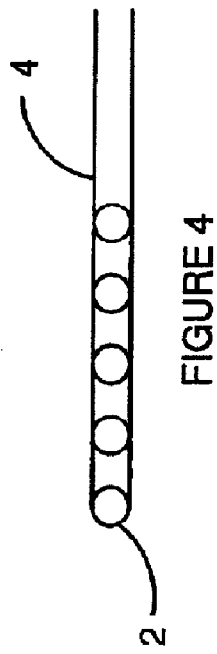
FIG. 4 is a further double ply version.

In a non-illustrated version two structures as shown in FIG. 4 and laid with tubes at 90° to each other and connected by adhesive face to face. The latter version mimics plywood in its strength and stiffness. The outer ply is corona treated to make it acceptable to flexographic printing.

These proceed to an apparatus which makes carton precursors as described in our co-pending application no. 2006901226.

Extrusion

Homopolymer polypropylene (PP) resins with the following properties are useful.

|  |  |  | Resin Blend | |
| --- | --- | --- | --- | --- |
| Properties |  |  | 3 Parts | 1 Part |
| Melt Flow Index | g/10 min | ASTM D1238 | 3 | 1.7 |
| Tensile Strength @ Yield | kg/cm$^2$ | ASTM D638 | 360 | 360 |
| Tensile Elongation @ Yield | % | ASTM D638 | 11 | >200 |
| Flexural Modulus | kg/cm$^2$ | ASTM D790 | 16,400 | 15,000 |
| Rockwell Hardness | R-Scale | ASTM D785 | 97 | 100 |
| Izod Impact Strength (23° C.) | kg-cm/cm$^2$ | ASTM D256 | 3.5 | 5 |
| Heat Deflection Temp | ° C. | ASTM D648 | 98 | 110 |
| Moulding Shrinkage | % | ASTM D955 | 1.4 | 1.5~1.9 |
| Specific Gravity | g/cm$^3$ | ASTM D792 | 0.902 | 0.90 |

A specific blend of homo polymer PP resin is required to achieve the necessary polymer rigidity to obtain the straightness in the tube, whilst also allowing for the "cushioning" effect offered by the tube, ie. when tube fully compressed pressure released, the tube will return to its original circular profile.

Figure 6:
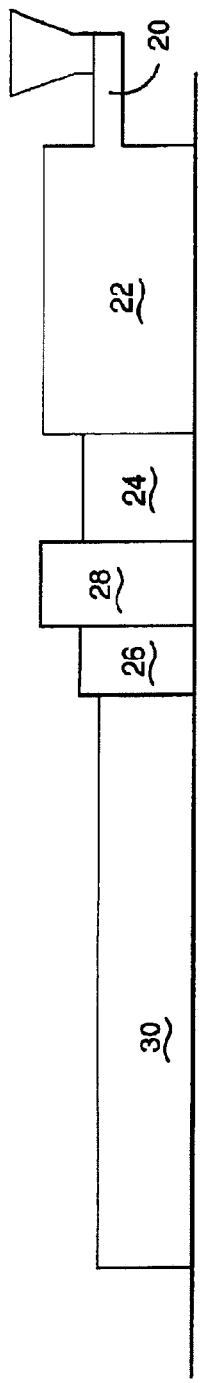
FIG. 6 is a schematic of the apparatus arranged in series for the production of a single ply version.

Referring now to FIG. 6, PP chips are fed to a 45 mm dia screw and barrel extruder 20 with a 10 mm exit die. The preferred operating temperature is 223° at the upper feed section and 235° C. at the die.

PP resin is melted and extruded through the screw and barrel and die, usually horizontally, to form a thin walled tube. A continuous volume of air under constant pressure is introduced via a bore in the centre of the die to blow up the tube to prevent bubble collapse and achieve the desired tube diameter. Tube is then fed into the vacuum sizing chamber/cooling bath 22 with a water coolant temperature no higher than room temperature, although a "closed" chilled water circulation system, set at a constant 18° C, is preferable. The chamber creates a tube with constant diameter and circular symmetry, whilst allowing the tube to cool and partially set.

It is important that the tube diameter be constant with a tolerance of minus 0% and plus 0.2%. The circular symmetry of the tube must also be completely "round". The overall performance characteristics of board using the tubes will be primarily determined by the quality, namely the constant diameter, circular symmetry and straightness of the tubes and the subsequent lamination.

Typically a 5 mm diameter tube is desired, but may be larger or smaller dependent upon the final application for the board. Typically the tubes are 1200 mm in length.

To ensure perfectly straight tubes, an additional rotating haul-off 24 is integrated into the standard thin walled extrusion machine. The additional rotating haul-off is placed immediately after the chilled water cooling bath thus allowing manipulation of the tube/bubble profile prior to the "frost line". The gauge-band, inherently associated with thin walled tube dies, is rotated symmetrically over 360° of the tube cross-section creating a spiral effect along the tube, thereby ensuring straight long tubes with no "bows".

It is important that the tube be completely straight with 0° of bow when placed down on a flat surface. The overall performance characteristics of the product will be primarily determined by the constant diameter, circular symmetry and straightness of the tubes and the subsequent lamination straightness allows a ply product with uniform geometry. If the array moves out of parallel or the tubes do not lie at 90° when the structure requires it, the reliability suffers and the subsequent assembly into box products cannot proceed smoothly.

Meanwhile the flexible face ply is laser cut to length from a roll. The ply substrate is HDPE about 40 μm thick. Before the tube has been cut to length by rotary cutter 26, the surfaces must be prepared to receive adhesives by corona discharge. It is convenient to apply the corona discharge step in generator 28 placed in series with the rotating haul-off, that is after the rotating haul-off, but before the static haul-off cutter. The tube is treated to a minimum of 42 dynes across 360° of the tube circumference. When the ply is treated, the entire surface is subject to discharge.

If tubes are to be heat laminated to a polyethylene or an equivalent substrate, corona treatment is not required.

Lamination

Ensuring constant tube diameter, constant circular symmetry and straightness will enable the precise adhesion (adhesive lamination) of the tubes to each other and to the film/sheets substrates, thereby creating the performance characteristics of the board.

HDPE film of 40 µm thickness, or greater, is preferable as the laminating film substrate. Film is corona treated to a minimum level of 42 dyne on the "adhesion" side of the film. To facilitate flexographic printing of the film on the opposite "print" side, a minimum corona treatment level of 38 dyne is required.

Application of adhesive to the three main components, {film substrate (top layer)-tubes-film substrate (bottom) layer}, is required Immediately prior to the three components being set together in the laminating process on bed 30.

Orientation of tubes is determined by a series of rollers, rotary tube collectors and stackers, prior to the application of adhesive and lamination to film substrates. Various tube orientation combinations can be achieved, dependent upon the final application of the board.

Typically, a two component, solvent based, polyurethane adhesive is used, one example being FORBO Swift CS2 232OR/CS2 2313D obtainable from Swift Adhésifs SA (France).

Figure 7:
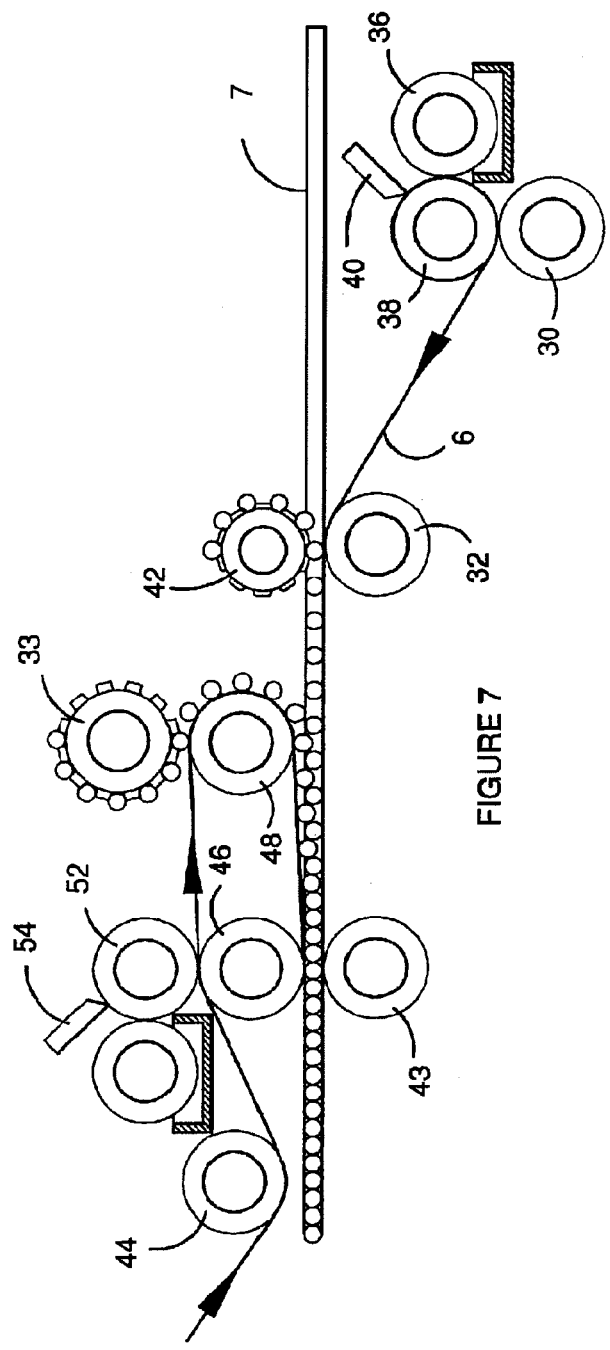
FIG. 7 is a diagram of the lamination process.

FIG. 7 shows the lamination process. Bottom ply 6 is supported by driven rolls 30, 32 and 43. The upper face of bottom ply 6 is rendered adhesive by a coating assembly consisting of dip roll 36, ANILOX™ roller 38 and doctor blade 40. These rolls are all full width.

A longitudinal tube feeder (not shown) feeds a stream of cut lengths of parallel side by side tubes 7 into the gap between driven roll 32 and tube feed roll 42. Fluted roll 42 has a centre portion equal in width to the stream of longitudinal tubes 7. Roll 42 additionally has end portions to the left and right of the central stream of longitudinal tubes. These portions are supplied with transverse tubes 2 by a magazine (not shown).

Figure 9:
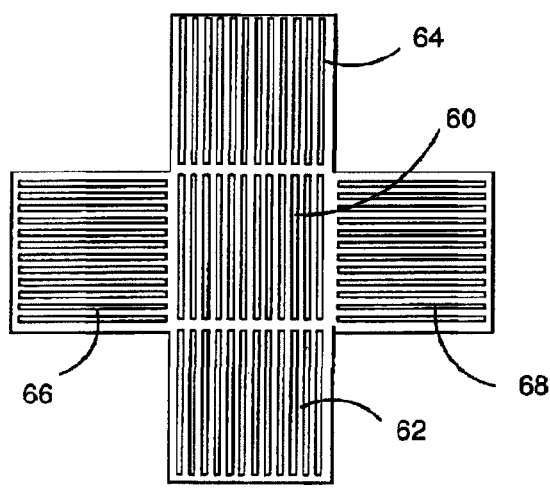
FIG. 9 is a diagram of the orientation of tubes in a food carton.

Roll 42 rotates continuously but the supply of transverse tubes is intermittent thereby creating a repeating cruciform blank as shown in FIG. 9 is produced. The arrangement shown initially produces a board with spaced transverse tubes. If contiguous tubes are required, a top ply is added. Top ply 4 from a stock roll (not shown) is supported by driven rolls 44, 46 and roll 48. Top ply 4 is rendered adhesive by dip roll 50, ANILOX™ roll 52 and doctor blade 54.

Rolls 44, 46, 48 are full width rolls. Roll 48 is a plain rubber roll but roll 33 has a centre portion and two end portions like roll 42 and these are fed by a magazine (not shown) with transverse tubes. If contiguous tube product is required, all three portions are fed and roll fluted 33 inserts a tube into the space between the spaced transverse tubes arriving on ply 6.

Contiguous Tube Board

Figure 8:
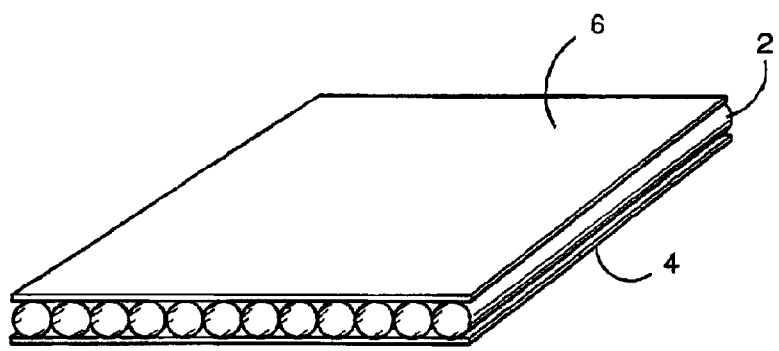
FIG. 8 is a diagram of the orientation of tubes in a real estate sign.

Tubes placed side-by-side, with adhesion points at 0°, 90°, 180° and 270°. This board is shown in FIG. 8.

| | |
|---|---|
| 0° | adhesion to film substrate (top layer). |
| 90° | adhesion to neighbouring tube, |
| 180° | adhesion to film substrate (bottom layer) |
| 270° | adhesion to neighbouring tube. |

By ensuring the precise adhesion points along the complete length of the tube, the boards have rigidity in the longitudinal direction of the tubes as well as the transverse direction of the tubes. Typically, a HDPE film of 40 µm thickness is used for the film substrate.

This tube array set-up is ideal for tube and film board to be fabricated into cartons and boxes. In FIG. 9, the floor 60 and two side walls 62, 64 have parallel tubes, whereas the remaining side walls 66, 68 have tubes laid perpendicular thereto.

Application of adhesive to film plies and board plies is conventional using standard coating technology. A doctor blade ANILOX™ roller and rubber nip rolls suffice.

Mutually Spaced Tube Board

Figure 1A:
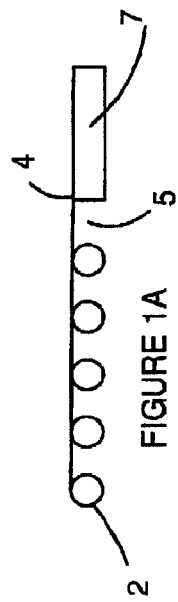
FIG. 1a is a single ply version with 90° tubes affixed.
Figure 2A:
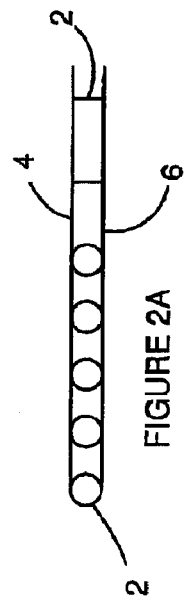
FIG. 2a is a double ply version with 90° tubes affixed.
Figure 3A:
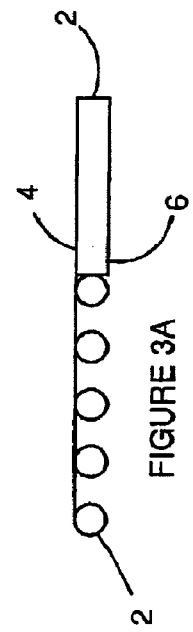
FIG. 3a is a further single ply version with 90° tube affixed.
Figure 3:
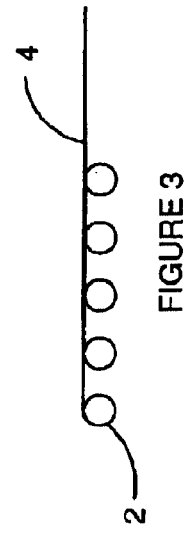
FIG. 3 is a further single ply version.

Tubes mutually spaced side-by-side, with adhesion points at 0° and 180°. This board is shown in FIG. 3A.

| | |
|---|---|
| 0° | adhesion to film substrate (top layer). |
| 90° | no adhesion. |
| 180° | adhesion to film substrate (bottom layer) |
| 270° | no adhesion. |

Having adhesion points at 0° and 180°, along the complete length of the tubes, such boards will have rigidity in the longitudinal direction (orientation) of the tubes, but will flex in the transverse direction of the tubes. Again, a HDPE film of 40 µm thickness is used for the film ply. This tube array set-up is ideal for sheet to be used as a cushioning cover, for example cylindrical items such as glass bottles.

Sheets measuring 8×4 feet when printed on one film face find use at point of sale displays in advertising. For these, 240 tubes of 5 mm diameter and 8 feet in length are laminated to the pre-printed ply to make a rigid board. In such a board, the tubes are all parallel to the 8 foot axis.

Smaller sheets are made as cruciform carton blanks. In cartons, it is preferable to have the tubes composing the four side walls standing vertically. This is achieved by orienting two side walls and an intervening floor on the long axis of the carton blank. The two boundaries between the three arrays allow the blank to fold creating a floor and two upright side walls. The third and fourth side walls are built by arranging a third and fourth arrays adjacent the opposite edges of the floor and at 90° to the long axis of the blank.

If the carton is printed on at least one face, the blank is pre-printed. The carton blank is assembled in a carton folder.

We have found the advantages of the above embodiment to be:—
1. Capable of exerting a cushioning effect as a packaging structure.
2. Resistance to moisture, oil and bacterial/mould attack.
3. Flexibility in a direction coupled to longitudinal rigidity in some configurations.

What is claimed is:
1. Synthetic board comprising a first array of side by side, thin-walled tubes, a second array of side by side, thin-walled tubes in a common plane, the second array being adjacent the first array but disposed transversely to the first array and a flexible face ply to which the tubes are fixed at a circumfer- ential site, whereby the board flexes about the boundary between the first array and the second array, and wherein the tubes are 3-5 mm in diameter.

2. Synthetic board as claimed in claim 1, wherein the tubes are contiguous.

3. Synthetic board as claimed in claim 1, wherein the tubes are mutually spaced.

4. Synthetic board as claimed in claim 1, wherein the tubes are fixed to a top facing ply and a bottom-facing ply, the tubes being attached to the plies at diametrically opposite sites.

5. Synthetic board comprising a first array of side by side, thin-walled tubes, a second array of side by side, thin-walled tubes in a common plane, the second array being adjacent the first array but disposed transversely to the first array and a flexible face ply to which the tubes are fixed at a circumferential site, whereby the board flexes about the boundary between the first array and the second array, and wherein the tubes are 100-250 μm in thickness.

6. Synthetic board as claimed in claim 5, wherein the tubes are contiguous.

7. Synthetic board as claimed in claim 5, wherein the tubes are mutually spaced.

8. Synthetic board as claimed in claim 5, wherein the tubes are fixed to a top facing ply and a bottom-facing ply, the tubes being attached to the plies at diametrically opposite sites.

9. Synthetic board comprising a first array of side by side, thin-walled tubes, a second array of side by side, thin-walled tubes in a common plane, the second array being adjacent the first array but disposed transversely to the first array and a flexible face ply to which the tubes are fixed at a circumferential site, whereby the board flexes about the boundary between the first array and the second array, and wherein the tubes contain particulate material.

10. Synthetic board as claimed in claim 9, wherein the tubes are contiguous.

11. Synthetic board as claimed in claim 9, wherein the tubes are mutually spaced.

12. Synthetic board as claimed in claim 9, wherein the tubes are fixed to a top facing ply and a bottom-facing ply, the tubes being attached to the plies at diametrically opposite sites.

13. Synthetic board comprising a first array of side by side, thin-walled tubes, a second array of side by side, thin-walled tubes in a common plane, the second array being adjacent the first array but disposed transversely to the first array and a flexible face ply to which the tubes are fixed at a circumferential site, whereby the board flexes about the boundary between the first array and the second array, and wherein the tubes contain cushioning gel.

14. Synthetic board as claimed in claim 13, wherein the tubes are contiguous.

15. Synthetic board as claimed in claim 13, wherein the tubes are mutually spaced.

16. Synthetic board as claimed in claim 13, wherein the tubes are fixed to a top facing ply and a bottom-facing ply, the tubes being attached to the plies at diametrically opposite sites.

* * * * *